United States Patent [19]
Vore et al.

[11] Patent Number: 5,692,453
[45] Date of Patent: Dec. 2, 1997

[54] THERMOSTAT

[75] Inventors: Raymond B. Vore; Max L. Green, both of Mansfield, Ohio

[73] Assignee: Therm-O-Disc, Incorporated, Mansfield, Ohio

[21] Appl. No.: 491,386

[22] Filed: Jun. 16, 1995

[51] Int. Cl.[6] .............. G09F 9/00; G05D 23/00; G05G 1/10
[52] U.S. Cl. .............. 116/315; 74/553; 236/94; 116/309
[58] Field of Search .............. 74/553; 116/306, 116/307, 309, 310, 311, 312, 313, 314, 315, 316, 317, 318, 319, 320; 236/94

[56] References Cited

U.S. PATENT DOCUMENTS 3,670,284  6/1972  Fortier et al. .............. 116/311 X
4,133,286  1/1979  Linton .............. 116/313

FOREIGN PATENT DOCUMENTS 3637451  5/1988  Germany.

*Primary Examiner*—William A. Cuchlinski, Jr.
*Assistant Examiner*—Willie Morris Worth
*Attorney, Agent, or Firm*—Jones, Day, Reavis & Pogue

[57] ABSTRACT

A rotatable knob for adjusting the temperature setting of a thermostat has a deformable tab that is permanently deformed upon rotational movement of the knob to a position that is indicative of a temperature setting greater than a predetermined optimum temperature setting. A deformed tab demonstrates that the knob was moved to a position for setting the thermostat at a temperature greater than the optimum temperature setting.

20 Claims, 3 Drawing Sheets

THERMOSTAT

BACKGROUND OF THE INVENTION

This application relates to the art of thermostats and, more particularly, to control knobs used to adjust the temperature setting of thermostats. The invention is particularly applicable to thermostats used for controlling the temperature of water in water heaters and will be described with specific reference thereto. However, it will be appreciated that the invention has broader aspects and can be used in thermostats for controlling the temperature of other devices and materials.

Water at a temperature in excess of about 120° F. is capable of causing burns to human skin. Although it is theoretically possible to manufacture a water heater that will not heat water above 120° F., certain users either desire or require water at a higher temperature. It would be desirable to provide a water heater thermostat that allows adjustment to a temperature setting greater than 120° F. but that does so in a manner that makes a user clearly aware that such an adjustment is being made or attempted. It would also be desirable to provide a water heater thermostat on which a permanent physical sign is formed upon adjustment to a temperature setting greater than about 120° F.

SUMMARY OF THE INVENTION

A thermostat housing and a rotatable temperature adjusting knob have cooperating stops for stopping movement of the knob when an attempt is made to rotate the knob past a predetermined temperature setting to a higher temperature setting. At least one of the stops is permanently deformable for allowing rotation of the knob significantly past the predetermined temperature setting to a higher temperature setting. Permanent deformation of the one stop provides a record establishing that the knob was indeed adjusted past the optimum temperature setting to a higher temperature setting.

In a preferred arrangement, the deformable stop comprises a tab projecting outwardly from the knob transversely of the knob rotational axis. The tab is preferably located less than 90° from a knob temperature setting indicator.

In accordance with another aspect of the application, the knob has a peripheral detent receiving a projection on a thermostat housing for releasably holding the knob at an optimum temperature setting. Rotation of the knob above the optimum temperature setting requires a conscious effort to separate the interdigitated detent and projection, and to deform the tab.

The tab may be frangible so it completely separates from the knob but the preferred arrangement provides a deformable tab that remains attached to the knob while being permanently deformed so that it cannot be restored to its original condition and position.

It is a principal object of the present invention to provide an improved thermostat having a temperature adjusting control knob that provides a permanent indication when the knob is adjusted to a temperature setting that is above an optimum temperature setting.

It is also an object of the invention to provide a temperature adjusting knob that requires a conscious and extraordinary effort to move same past an optimum temperature setting to a higher temperature setting.

It is another object of the invention to provide such a thermostat and knob assembly that is economical and efficient to manufacture and assemble.

DESCRIPTION OF A PREFERRED EMBODIMENT

Figure 1:
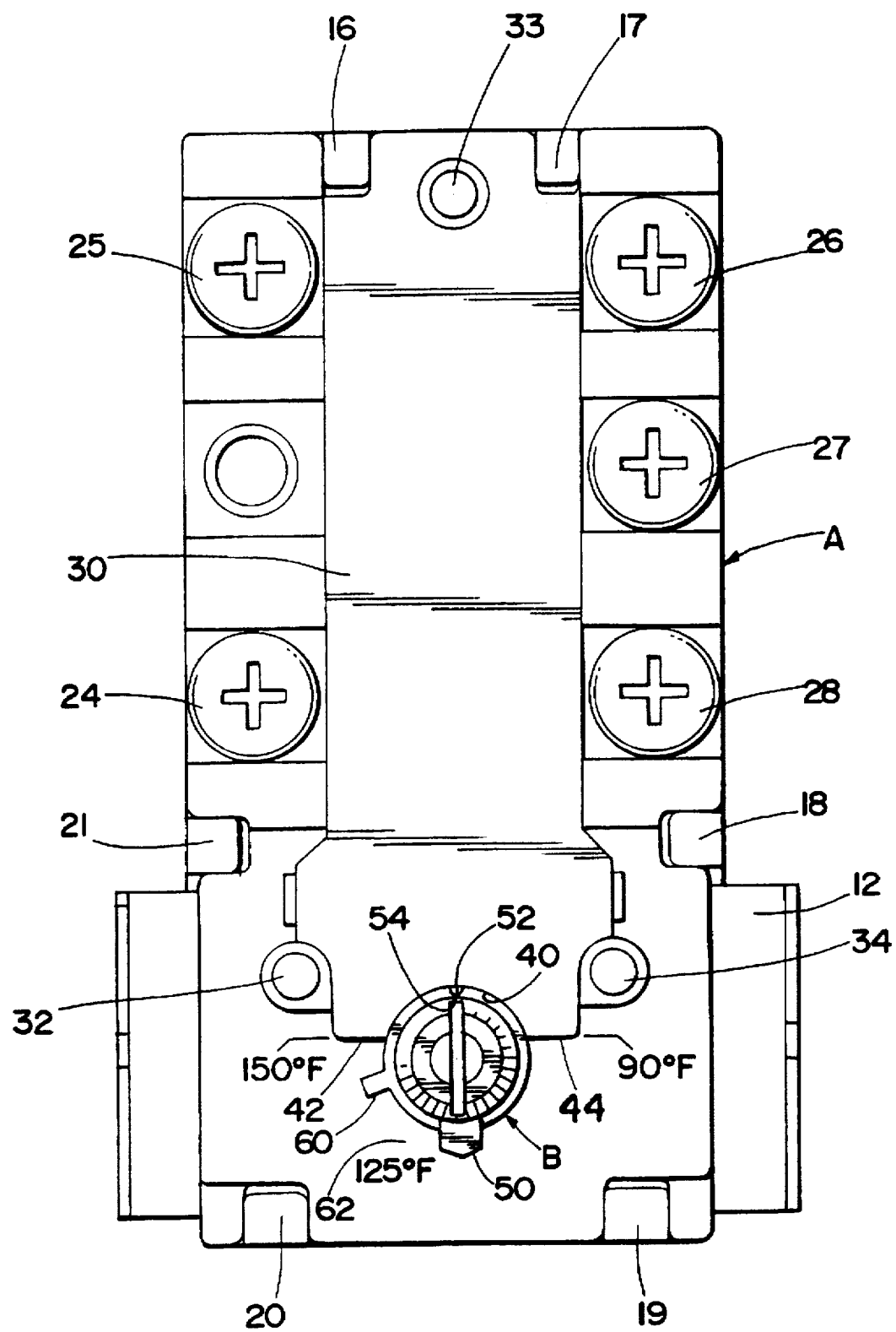
FIG. 1 is a front elevational view of a thermostat having the improvements of the present application incorporated therein.
Figure 2:
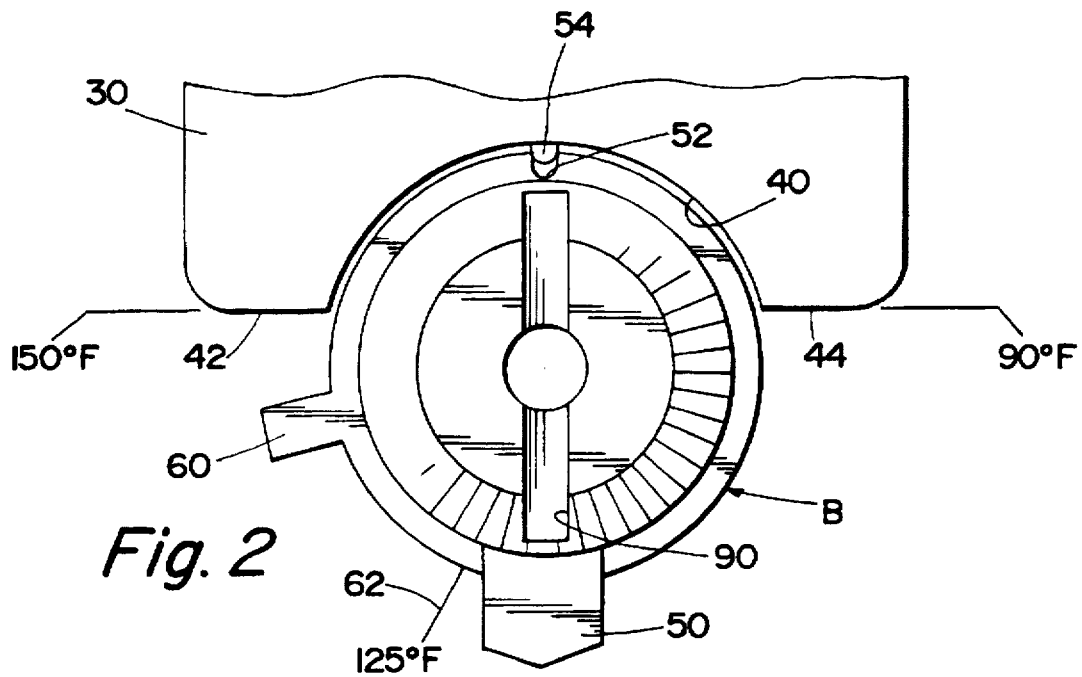
FIG. 2 is an enlarged front elevational view showing the rotatable temperature adjusting knob of the present application installed on a thermostat.
Figures 3, 4:
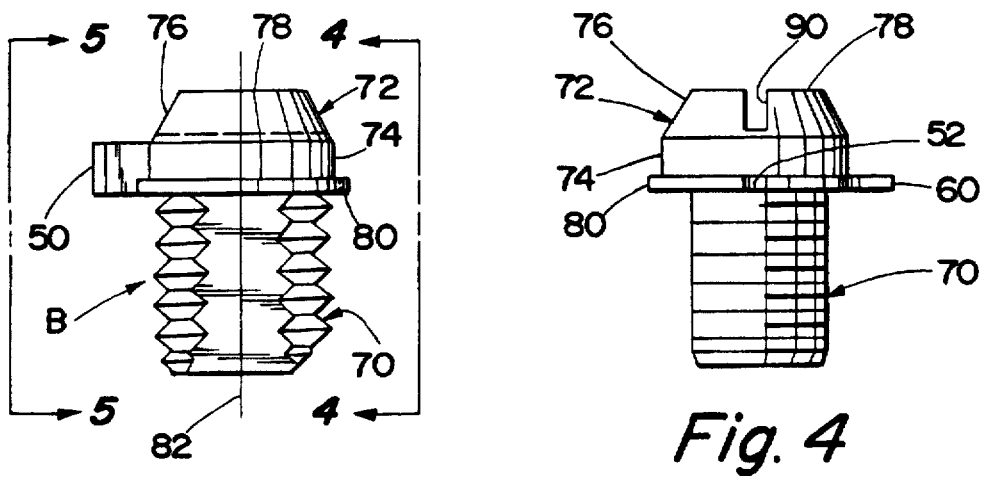
FIG. 3 is a side elevational view of the temperature adjusting knob of the present application.
FIG. 4 is a rear elevational view taken generally on line 4—4 of FIG. 3.

Referring now to the drawing, wherein the showings are for purposes of illustrating a preferred embodiment of the invention only and not for purposes of limiting same, FIG. 1 shows a thermostat assembly A having a housing 10 enclosing an adjustable temperature responsive thermostat. The open back of housing 10 is closed by a metal mounting plate 12 that has tabs 16–21 bent over the front of housing A for holding the parts assembled. Screw terminals 24–28 associated with the internal thermostat provide connections for electrical wires.

A cover member 30 attached to housing 10 by rivets 32–34 has an arcuate external bottom peripheral recess 40 between shoulders 42, 44.

A rotatable control knob B is attached to housing 10 for adjusting the temperature setting of the thermostat enclosed within housing 10. Knob B has an indicator defined by an outwardly extending pointer 50 for indicating the temperature setting of the thermostat in cooperation with indicia on housing 10. With pointer 50 at the six o'clock position shown in FIG. 1, the thermostat temperature setting is approximately 120° F. The periphery of knob B includes a detent 52 opposite from pointer 50, and a projection 54 extending outwardly from arcuate surface 40 is received in detent 52. Rotation of knob B from the factory installed optimum temperature setting shown requires a conscious and extra effort because of the resistance provided by interdigitated detent 52 and projection 54.

Control knob B includes an outwardly extending deformable tab 60 angularly-spaced less than 90° from pointer 50. The angle between the center lines of pointer 50 and tab 60 is approximately 77°. Knob B can be rotated clockwise from the position shown in FIG. 1 through an arc of approximately 17° before tab 60 will bear against shoulder 42. Pointer 50 will then be aligned with the indicia 62 indicating a temperature setting of about 125° F. Thus, shoulder 42 and tab 60 define cooperating stops for preventing easy movement of knob B any significant amount above the optimum temperature setting of about 120° F. Additional conscious and clockwise extraordinary rotational force applied to knob B will cause tab 60 to deform so that a higher temperature setting can be achieved. There is sufficient clearance between arcuate recess 40 in cover member 30 and the periphery of knob B to allow deformable tab 60 to move between surface 40 and knob B.

Referring now to FIGS. 3-6, knob B includes an elongated externally threaded shank portion 70 and an enlarged head portion 72. Head 72 includes a substantially cylindrical portion 74 intersecting a frusto-conical portion 276 that terminates in a flat top end 78. A thin peripheral flange 80 extends outwardly from cylindrical portion 74 from head 72 adjacent shank portion 70. Pointer 50 has a substantial thickness parallel to the central rotational axis 82 of knob B and also extends outwardly significantly farther than flange 80.

Figure 5:
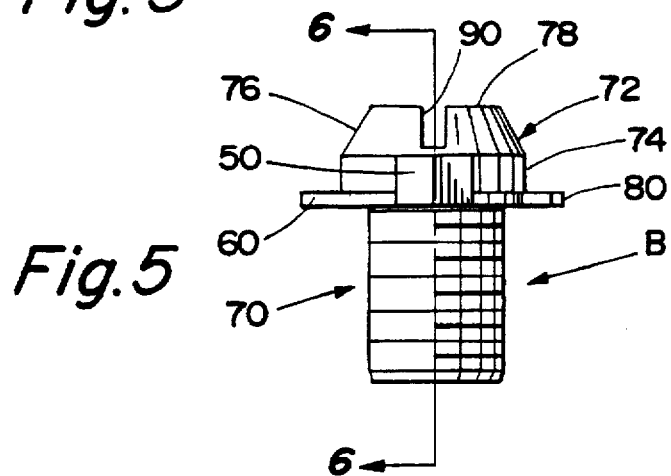
FIG. 5 is a front elevational view taken generally on line 5—5 of FIG. 3.

As best shown in FIG. 5, deformable tab 60 has a thickness parallel to rotational axis 82 that is the same the thickness of flange 80 and is substantially less than the thickness of pointer 50. Tab 60 can be constructed or arranged so that it will break completely off from knob B when the knob is rotated above the optimum temperature setting. However, the preferred arrangement simply provides for permanent deformation of tab 60 by stretching of the plastic material beyond its elastic limit while the tab remains firmly attached to the knob. A slot 90 for a screwdriver blade or other tool extends across head 72 between pointer 50 and dimple 52 to facilitate rotation of knob B.

Figure 6:
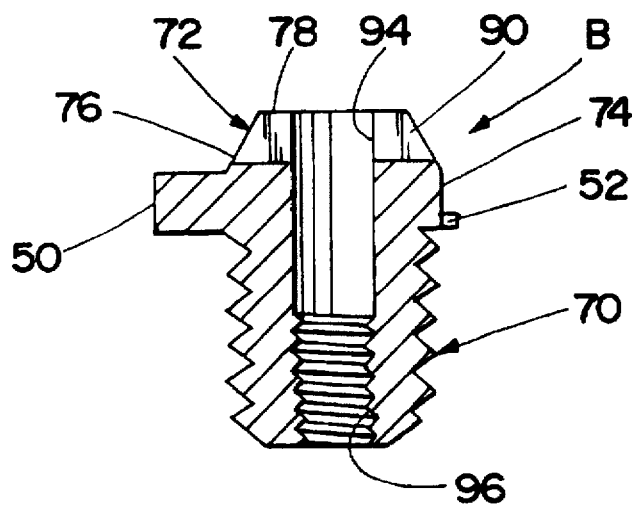
FIG. 6 is a cross-sectional elevational view taken generally on line 6—6 of FIG. 5.

With reference to FIG. 6, a central hole 94 axially through knob B is internally threaded as indicated at 96 adjacent the bottom end thereof. A set screw is receivable within hole 94 and cooperates with threads 96 for adjusting the position of the set screw relative to knob B.

Figure 7:
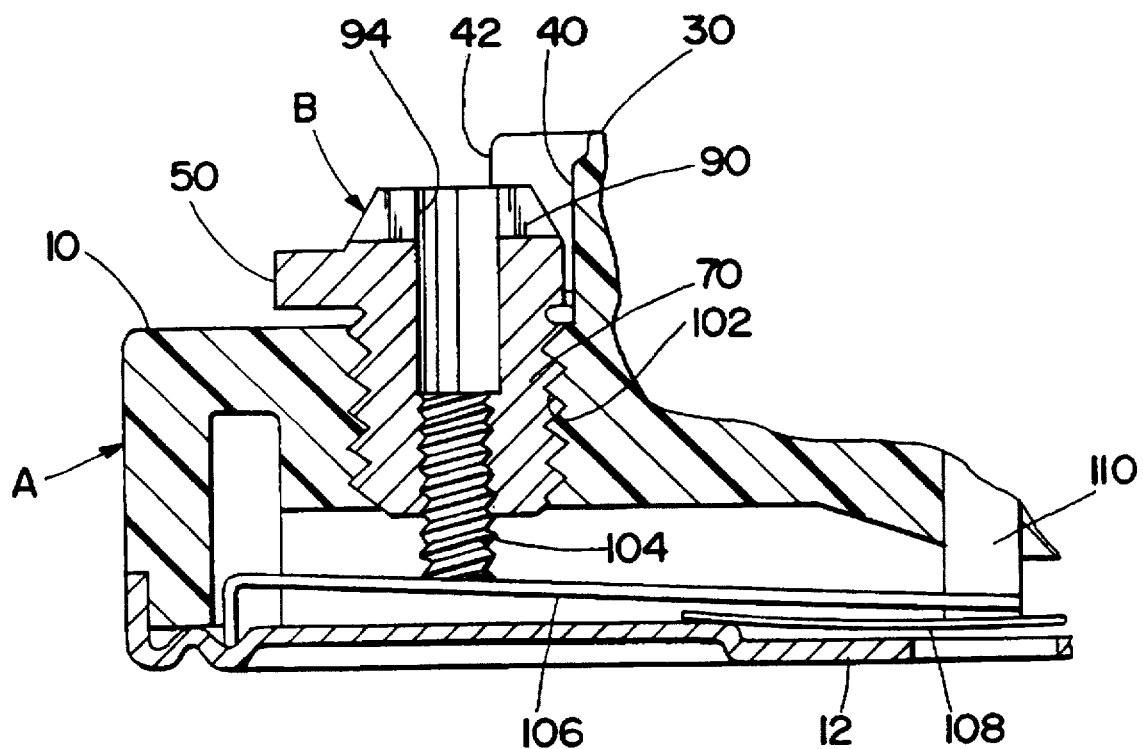
FIG. 7 is a partial cross-sectional elevational view showing the control knob of FIGS. 3–6 threaded into an opening in a thermostat housing.

FIG. 7 shows externally threaded shank portion 70 of control knob B threadably received in a threaded opening 102 in housing 10. A set screw 104 threaded into the internal threads in control knob central hole 94 engages a leaf spring 106 that applies force to a bimetal disc 108 that cooperates with a reciprocating bumper 110 to open a pair of contacts. With pointer 50 located at the six o'clock position shown in FIG. 1, set screw 104 is adjusted to calibrate the thermostat so that the contacts will open at the optimum temperature setting of about 120° F. Set screw 104 may be locked in position against rotation relative to knob B by the use of adhesive after calibration has been completed. Subsequent rotation of knob B relative to housing 10 causes knob B and set screw 104 to move axially in a direction in or out of housing 10 to increase or decrease the biasing force of leaf spring 106 on bimetal disc 108 and thereby change the temperature setting of the thermostat.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. In a thermostat having a housing and a rotatable knob for adjusting the thermostat temperature setting, cooperating indicators on said housing and knob for indicating the thermostat temperature setting, said thermostat having an optimum temperature setting, cooperating stops on said housing and knob for stopping said knob from rotating significantly past said optimum temperature setting to a significantly higher thermostat temperature setting that is significantly greater than said optimum temperature setting, and one of said stops being of a material having an elastic limit and being permanently deformable beyond said elastic limit for allowing rotation of said knob significantly past said optimum temperature setting, said one of said stops being incapable of restoration to its original condition and position following permanent deformation thereof beyond said elastic limit.

2. The thermostat of claim 1 wherein said knob has a circumferentially-extending flange with a flange outer periphery, said one of said stops being on said knob projecting outwardly beyond said flange outer periphery.

3. The thermostat of claim 2 wherein said one of said stops is angularly displaced less than 90° from said indicator on said knob in the direction of rotation of said knob toward said significantly higher thermostat temperature setting.

4. The thermostat of claim 2 wherein said knob rotates about a knob axis and said one of said stops comprises a stop tab extending outwardly from said flange outer periphery transversely of said knob axis.

5. The thermostat of claim 1 wherein said knob has an outer periphery and rotates about a knob axis, said one of said stops comprising a stop tab on said knob projecting outwardly beyond said outer periphery transversely of said axis.

6. The thermostat of claim 1 wherein said knob rotates about a knob axis and said indicator on said knob comprises an indicator pointer extending outwardly from said knob transversely of said axis, said one of said stops comprising a stop tab extending outwardly from said knob transversely of said axis in angularly-spaced relationship to said indicator pointer, and said stop tab being angularly-spaced from said stop on said housing in said optimum temperature setting position of said knob by angle that is substantially smaller than the angular spacing between said stop tab and said indicator pointer.

7. The thermostat of claim 6 wherein said stop tab is angularly-spaced less than 90° from said indicator pointer.

8. The thermostat of claim 6 wherein said knob has a thin peripheral flange with a peripheral dimple therein receiving a projection on said housing when said knob is positioned at said optimum temperature setting.

9. A thermostat knob of a material having an elastic limit, said knob having a head and a longitudinal axis about which the knob is rotatable, an indicator on said head for indicating a rotated position of said knob, a deformable stop on said head angularly displaced from said indicator for normally stopping rotation of said knob any significant amount above an optimum position while allowing rotational movement of said knob significantly beyond said optimum position by permanent deformation of said stop beyond said elastic limit.

10. The knob of claim 9 wherein said indicator and said stop comprise an indicator pointer and a stop tab respectively extending outwardly from said head transversely of said axis.

11. The knob of claim 10 wherein said knob head has an outer periphery and both said stop tab and said indicator pointer protect outwardly beyond said outer periphery, and said stop tab being angularly-spaced less than 90° from said indicator pointer.

12. The knob of claim 9 wherein said head includes a peripheral flange having a dimple therein.

13. The knob of claim 12 wherein said indicator and said dimple are opposite one another.

14. A thermostat knob having an outer periphery, a dimple and an indicator pointer located substantially opposite one another on said outer periphery, and a permanently deformable stop tab projecting outwardly beyond said outer periphery intermediate said dimple and said indicator pointer in angularly-spaced relationship to both said dimple and said indicator pointer.

15. The knob of claim 14 wherein said stop tab is closer to said indicator pointer than to said dimple.

16. The knob of claim 15 wherein said knob has a circumferentially-extending thin flange and said stop tab projects outwardly from said thin flange.

17. In a thermostat having a housing and a rotatable knob for adjusting the thermostat temperature setting, said knob being of a material having an elastic limit, cooperating indicators on said housing and knob for indicating the thermostat temperature setting, said thermostat having an optimum temperature setting corresponding to an optimum temperature position of said knob, cooperating stops on said housing and knob for stopping said knob from rotating significantly past said optimum temperature position to a significantly higher temperature setting that is significantly greater than said optimum temperature setting, said stop on said knob comprising a stop tab projecting outwardly therefrom, said stop tab being permanently deformable beyond said elastic limit to allow rotation of said knob significantly past said optimum temperature position to a significantly higher thermostat temperature setting, said stop tab being incapable of restoration to its original condition and position following permanent deformation thereof beyond said elastic limit to provide a telltale legend indicative of rotation of said knob significantly past said optimum temperature position to a significantly higher thermostat temperature setting.

18. The thermostat of claim 17 wherein said knob and housing include cooperating rotation resisting means on said housing and knob for inhibiting rotation of said knob from said optimum temperature position, said knob being rotatable past said optimum temperature position by application of conscious rotational force to said knob to overcome the rotational resistance provided by said rotation resisting means.

19. The thermostat of claim 18 wherein said rotation resisting means comprises a projection on said housing received in a dimple on said knob.

20. The thermostat of claim 17 wherein said knob has a circumferentially-extending flange with a flange outer periphery and said stop tab extends outwardly from said flange outer periphery.

* * * * *